United States Patent
Xu et al.

(10) Patent No.: US 9,730,175 B2
(45) Date of Patent: Aug. 8, 2017

(54) METHOD AND SYSTEM FOR DETERMINING DELAY DIFFERENCE, BASE STATION AND USER EQUIPMENT

(71) Applicant: ZTE CORPORATION, Shenzhen, Guangdong Province (CN)

(72) Inventors: Hanqing Xu, Shenzhen (CN); Yajun Zhao, Shenzhen (CN); Linmei Mo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/114,076

(22) PCT Filed: Jun. 18, 2014

(86) PCT No.: PCT/CN2014/080230
§ 371 (c)(1),
(2) Date: Aug. 24, 2016

(87) PCT Pub. No.: WO2015/109737
PCT Pub. Date: Jul. 30, 2015

(65) Prior Publication Data
US 2017/0006570 A1    Jan. 5, 2017

(30) Foreign Application Priority Data
Jan. 27, 2014   (CN) .......................... 2014 1 0041007

(51) Int. Cl.
*H04W 56/00*   (2009.01)
*H04W 74/00*   (2009.01)
(Continued)

(52) U.S. Cl.
CPC ....... *H04W 56/0065* (2013.01); *H04W 56/00* (2013.01); *H04W 56/004* (2013.01);
(Continued)

(58) Field of Classification Search
CPC ..................... H04W 56/0065; H04W 74/004
See application file for complete search history.

(56) References Cited

U.S. PATENT DOCUMENTS

| 2008/0267105 | A1 | 10/2008 | Wang et al. |
| 2010/0296491 | A1* | 11/2010 | Wang ............ H04J 3/0638 370/336 |

FOREIGN PATENT DOCUMENTS

| CN | 101557604 A | 10/2009 |
| CN | 102474838 A | 5/2012 |

(Continued)

*Primary Examiner* — Tuan H Nguyen
(74) *Attorney, Agent, or Firm* — Ling Wu; Stepehn Yang; Ling and Yang Intellectual Property

(57) ABSTRACT

The present document discloses a method and a system for determining a delay difference, and a base station and UE, the method includes: a serving cell receiving information of time measured by a neighboring cell at which uplink channel/signal information of UE for determining a synchronization delay is received; and the serving cell determining a synchronization delay difference between the UE to the serving cell and the UE to the neighboring cell according to information of time measured by the serving cell at which the uplink channel/signal information of the UE for determining the synchronization delay is received, and the information of time measured by the neighboring cell and at which the uplink channel/signal information of the UE for determining the synchronization delay is received, wherein the uplink channel/signal information measured by the serving cell is the same as the uplink channel/signal information measured by the neighboring cell.

21 Claims, 6 Drawing Sheets

---

A serving cell receives information of time which is measured by a neighboring cell and at which uplink channel/signal information of UE for determining a synchronization delay is received — 101

The serving cell determines a synchronization delay difference between the UE to the serving cell itself and the UE to the neighboring cell — 102

(51) Int. Cl.
*H04W 76/04* (2009.01)
*H04W 88/02* (2009.01)
*H04W 88/08* (2009.01)

(52) U.S. Cl.
CPC ... *H04W 56/0005* (2013.01); *H04W 56/0015* (2013.01); *H04W 56/0055* (2013.01); *H04W 74/004* (2013.01); *H04W 76/048* (2013.01); *H04W 88/02* (2013.01); *H04W 88/08* (2013.01)

(56) References Cited

FOREIGN PATENT DOCUMENTS

| | | |
|---|---|---|
| CN | 103139809 A | 6/2013 |
| CN | 103220731 A | 7/2013 |
| EP | 2472977 A1 | 4/2012 |
| WO | 2011011760 A2 | 1/2011 |
| WO | 2012112098 A1 | 8/2012 |

\* cited by examiner

METHOD AND SYSTEM FOR DETERMINING DELAY DIFFERENCE, BASE STATION AND USER EQUIPMENT

TECHNICAL FIELD

The present document relates to the field of radio communication, in particular to a method and system for determining a delay difference, a base station and User Equipment (UE).

BACKGROUND OF THE RELATED ART

With the quick development of mobile internet and the increasing popularization of smart terminals, requirements of users on data transmission rate and user experience become increasingly higher. In order to improve user experience and system throughput, especially in order to improve throughput of hotspot areas, networking architecture of a heterogeneous network is put forward, i.e., a plurality of low-power small base stations are placed in an area covered by a macro base station, and the macro base station and the small base stations jointly form the heterogeneous network; and in other words, a great amount of small cells are deployed in an area covered by a macro cell, wherein the macro base station corresponds to the macro cell and the small base stations correspond to the small cells.

The dense deployment of the small cells is an effective mechanism for improving a network capacity and reducing coverage holes. However, it also causes the problems of serious interference between cells and energy consumption increase of the cells. For the reason, a small cell on/off technical solution is put forward. The small cell on/off technical solution can adaptively control on/off of the small cells. For example, under the situation that the small cells have no demand on UE connection or service, the small cells can be turned off to reduce the interference with neighboring cells while the power consumption can be reduced.

When the small cell on/off technical solution is adopted, in other words, in an application scenario of small cell on/off, UE resides in a serving cell, supposing that the UE resides in a small cell 1 or a macro cell; simultaneously, the UE still searches for other neighboring small cells, supposing that the other small cell which is searched out is a small cell 2; here, the UE is in an RRC_CONNECTED state, and in other words, the UE is in a state in which information sent by the serving cell can be received in real time; and the searched other small cells may be in an on state and may also be in an off state. Under this circumstance, the serving cell of the UE, i.e., the small cell 1 or the macro cell does not know time of transmission between the UE and the small cell 2, the serving cell of the UE also does not know precise time for the small cell 2 sending a discovery time, and thus the serving cell of the UE cannot inform of the UE the precise time for the small cell 2 sending the discovery signal. A signal transmission delay and a sending delay of the discovery signal sent by the small cell 2 cause that signals received by the UE from the serving cell and the small cell 2 are not synchronized. As a result, a searching window becomes larger, the discovery delay becomes greater, consequently the processing implementation of signals received by the UE is complicated and the power consumption of the UE is increased accordingly.

SUMMARY

In order to solve the technical problem existing in the existing art, the embodiments of the present document provide a method for determining a delay difference, a base station, UE and a system.

In order to achieve the purpose, the technical solutions of the embodiments of the present document are implemented as follows:

A method for determining a delay difference comprises:
a serving cell receiving information of time which is measured by a neighboring cell and at which uplink channel/signal information of UE for determining a synchronization delay is received; and the serving cell determining a synchronization delay difference between the UE to the serving cell itself and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay.

A method for determining a delay difference comprises:
a neighboring cell of a serving cell sending information of time which is measured by the neighboring cell itself and at which uplink channel/signal information of UE for determining a synchronization delay is received to the serving cell; and the serving cell determining a synchronization delay difference between the UE to the serving cell and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay.

A method for determining a delay difference comprises:
UE measuring information of time at which downlink channel/signal information of a serving cell for determining a synchronization delay is received and information of time at which downlink channel/signal information of a neighboring cell of the serving cell for determining a synchronization delay is received; and the UE determining a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

A method for determining a delay difference comprises:
a serving cell and a neighboring cell sending downlink channel/signal information for determining a synchronization delay to UE at a same time;

the UE measuring information of time at which the downlink channel/signal information of the serving cell for determining the synchronization delay is received and information of time at which the downlink channel/signal information of the neighboring cell of the serving cell for determining the synchronization delay is received; and the UE determining a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

A base station comprises a first receiving module and a first determination module, wherein, the first receiving module is configured to receive information of time which is measured by a neighboring cell and at which uplink channel/signal information of UE for determining a synchronization delay is received; and the first determination module is configured to determine a synchronization delay difference between the UE to the base station itself and the UE to the neighboring cell according to information of time which is measured by the base station itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay.

A system for determining a delay difference comprises a first base station corresponding to a serving cell, a second base station corresponding to a neighboring cell and a first UE, wherein, the first base station is configured to receive information of time which is measured by the second base station and at which uplink channel/signal information of the first UE for determining a synchronization delay is received; and determine a synchronization delay difference between the first UE to the first base station itself and the UE to the second base station according to information of time which is measured by the first base station itself and at which the uplink channel/signal information of the first UE for determining the synchronization delay is received, and the information of time which is measured by the second base station and at which the uplink channel/signal information of the first UE for determining the synchronization delay is received; and the second base station is configured to send the information of time which is measured by the second base station itself and at which the uplink channel/signal information of the first UE for determining the synchronization delay is received to the first base station, wherein the uplink channel/signal information, which is measured by the first base station, of the first UE for determining the synchronization delay is the same as the uplink channel/signal information, which is measured by the second base station, of the first UE for determining the synchronization delay.

A UE comprises a measurement module and a second determination module, wherein, the measurement module is configured to measure information of time at which downlink channel/signal information of a serving cell for determining a synchronization delay is received and information of time at which downlink channel/signal information of a neighboring cell of the serving cell for determining a synchronization delay is received; and the second determination module is configured to determine a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

A system for determining a delay difference comprises a second UE, a third base station corresponding to a serving cell and a fourth base station corresponding to a neighboring cell, wherein, the second UE is configured to measure information of time at which downlink channel/signal information of the third base station for determining a synchronization delay is received and information of time at which downlink channel/signal information of the fourth base station for determining a synchronization delay is received; and determine a synchronization delay difference between the second UE itself to the third base station and the second UE itself to the fourth base station according to the measured information of time at which the downlink channel/signal information of the third base station for determining the synchronization delay is received, and the measured information of time at which the downlink channel/signal information of the fourth base station for determining the synchronization delay is received, wherein the downlink channel/signal information of the third base station for determining the synchronization delay is the same as the downlink channel/signal information of the fourth base station for determining the synchronization delay;

the third base station is configured to send the downlink channel/signal information for determining the synchronization delay to the second UE;

the fourth base station is configured to send the downlink channel/signal information for determining the synchronization delay to the second UE; and the third base station and the fourth base station send the downlink channel/signal information for determining the synchronization delay to the second UE at a same time.

A computer storage medium comprises a group of instructions, wherein when the instructions are executed, at least one processor is enabled to implement any above mentioned method for determining the delay difference.

According to the method for determining the delay difference, the base station, the UE and the system provided by the embodiments of the present document, the serving cell receives the information of time which is measured by the neighboring cell and at which the uplink channel/signal information of the UE for determining the synchronization delay is received; and the serving cell determines the synchronization delay difference between the UE to the serving cell itself and the UE to the neighboring cell according to the information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay; or, the UE measures the information of time at which the downlink channel/signal information of the serving cell for determining the synchronization delay is received and the information of time at which the downlink channel/signal information of the neighboring cell of the serving cell for determining the synchronization delay is received; and the UE determines the synchronization delay difference between the UE to the serving cell and the UE to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay. Thereby, the synchronization delay difference between the UE to the serving cell and the UE to the neighboring cell can be effectively determined, and thus the synchronization of the information from the serving cell and the small cell, which is received by the UE, is realized.

BRIEF DESCRIPTION OF DRAWINGS

In the drawings (which are not necessarily drawn according to the scale), similar drawing reference signs can describe the similar components in different views. The similar drawing reference signs suffixed with different letters can express different examples of similar components. The drawings generally illustrate all embodiments discussed in the text in an exemplary manner instead of a limited manner.

SPECIFIED EMBODIMENTS

Figure 1:
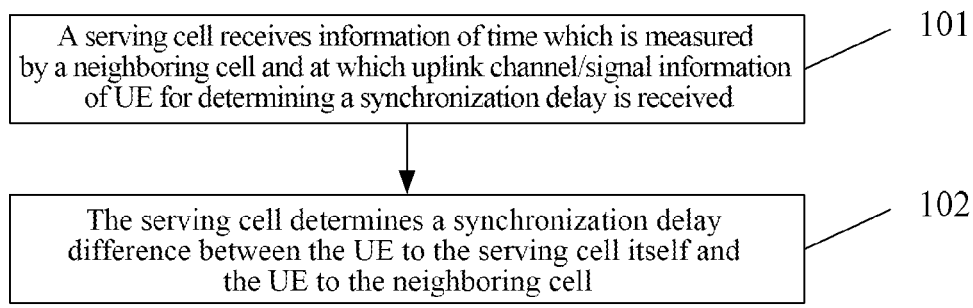
FIG. 1 is a flowchart of a method for determining a delay difference provided by embodiment 1 of the present document.

It needs to be stated that, in the description below, interaction between a serving cell and a neighboring cell refers to interaction between a base station corresponding to the serving cell and a base station corresponding to the neighboring cell; interaction between the serving cell and UE refers to interaction between the base station corresponding to the serving cell and the UE; interaction between the neighboring cell and the UE refers to interaction between the base station corresponding to the neighboring cell and the UE; interaction between a macro cell and the UE refers to interaction between a macro base station corresponding to the macro cell and the UE; and interaction between a cluster-head and the UE refers to interaction between a base station corresponding to the cluster-head and the UE.

It also needs to be stated that the solutions of the embodiments of the present document are applicable to a small cell on/off application scenario in a heterogeneous network, i.e., they are applicable to an application scenario that a plurality of low-power-consumption small base stations are placed in an area covered by the macro base station, the heterogeneous network is jointly formed by the macro base station and the small base stations, and the small cell on/off technical solution is adopted.

In each embodiment of the present document, a serving cell receives information of time which is measured by a neighboring cell and at which uplink channel/signal information of UE for determining a synchronization delay is received; and the serving cell determines a synchronization delay difference between the UE to the serving cell itself and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received, wherein the uplink channel/signal information, which is measured by the serving cell, of the UE for determining the synchronization delay is the same as the uplink channel/signal information, which is measured by the neighboring cell, of the UE for determining the synchronization delay; or the UE measures information of time at which downlink channel/signal information of a serving cell for determining a synchronization delay is received and information of time at which downlink channel/signal information of a neighboring cell of the serving cell for determining a synchronization delay is received; and the UE determines a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received, wherein the downlink channel/ signal information of the serving cell for determining the synchronization delay is the same as the downlink channel/ signal information of the neighboring cell for determining the synchronization delay.

The present document will be further described below in detail in combination with the drawings and the specified embodiments.

Embodiment 1

A method for determining a delay difference provided by this embodiment, as illustrated in FIG. 1, comprises the following steps:

In step 101, a serving cell receives information of time which is measured by a neighboring cell and at which uplink channel/signal information of UE for determining a synchronization delay is received.

Here, the serving cell refers to a cell in which the UE resides; and the neighboring cell refers to a neighboring cell of the serving cell.

The serving cell may be a macro cell or a small cell; correspondingly, when the serving cell is a macro cell, the neighboring cell is a small cell; and when the serving cell is a small cell, the neighboring cell is a macro cell or a small cell, wherein the macro cell corresponds to a macro base station; and the small cell corresponds to a small base station.

The uplink channel/signal for determining the synchronization delay may be any one of Physical Uplink Shared CHannel (PUSCH), Physical Uplink Control CHannel (PUCCH), Physical Random Access CHannel (PRACH), DeModulation Reference Signal (DMRS) and Sounding Reference Signal (SRS); and in actual application, one of the above channels/signals may be selected as needed.

Before this step, the method may further comprise:

the serving cell informs the neighboring cell of configuration information of an uplink channel/signal of the UE for determining the synchronization delay, such that the neighboring cell can correctly receive the uplink channel/signal information sent by the UE for determining the synchronization delay at a correct time.

Before this step, the method may further comprise:

the serving cell sends configuration information of an uplink channel/signal to the UE, such that the UE can send information to the serving cell according to the configuration information and thus the serving cell can correctly receive the information sent by the UE.

When the neighboring cell is a small cell and a state of the neighboring cell is an off state, before this step, the method further comprises:

the serving cell informs the UE of patterns and measurement indications of a Discontinuous Transmission ON (DTX_ON) state and a Discontinuous Reception ON (DRX_ON) state of the neighboring cell during a sleep period, such that the neighboring cell can correctly receive the uplink channel/signal information sent by the UE for determining the synchronization delay at a correct time.

Figure 2:
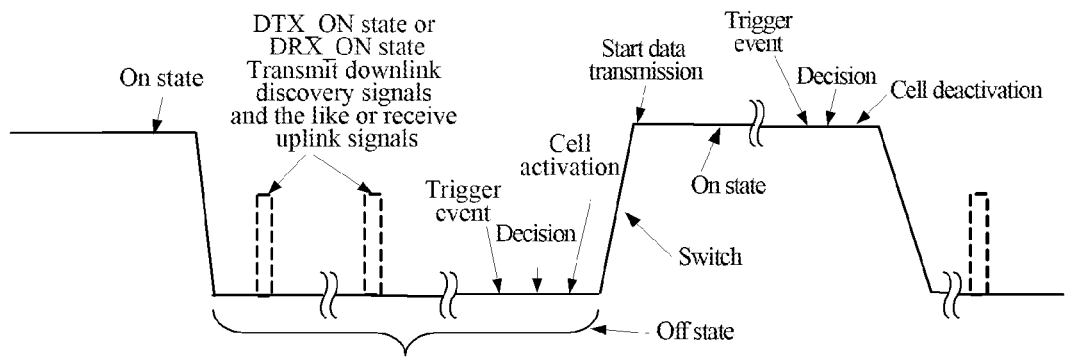
FIG. 2 is a schematic diagram of all states of a neighboring cell defined by the embodiment of the present document.

Therein, as illustrated in FIG. 2, the off state refers to that, when a small cell has no service or no UE connection, a small base station corresponding to the small cell is turned off to reduce interference and power consumption, generally the small base station will turn off a downlink transmitter and a state of an uplink receiver of the small base station depends on a specific situation.

The DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

The DRX_ON state is a sub-state of the off state, as illustrated in FIG. 2, the DRX_ON state refers to that, when the small cell has no service or no UE connection, the small base station corresponding to the small cell turns off the downlink transmitter while the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information, wherein the discovery signal information is used for cell discovery; and the PSS/ SSS and/or CRS information is used for synchronization. The sending periods of these signals may be inconsistent. When the small cell is in the DTX_ON state, the small cell may send one or more of these signals.

The patterns may comprise information such as period, offset and duration, etc.

In step 102, the serving cell determines a synchronization delay difference between the UE to the serving cell and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received, wherein the uplink channel/signal information, which is measured by the serving cell, of the UE for determining the synchronization delay is the same as the uplink channel/signal information, which is measured by the neighboring cell, of the UE for determining the synchronization delay.

The method may further comprise:

the serving cell sends the determined synchronization delay difference to the UE such that the UE receives information sent by the serving cell and the neighboring cell by using the synchronization delay difference; or, the serving cell sends information to the UE in advance or delay according to the determined synchronization delay difference.

Herein, sending the determined synchronization delay difference to the UE specifically comprises:

the serving cell sends an absolute value or a quantization level of the synchronization delay difference to the UE; or the serving cell sends the quantization level of the synchronization delay difference and signaling to the UE; or the serving cell sends the absolute value of the synchronization delay difference and signaling to the UE.

Here, the quantization level may be set as needed. For example, supposing that the information of time which is measured by the serving cell and at which the uplink channel/signal information of the UE for determining the synchronization delay is T1 and the information of time which is measured by the neighboring cell and at which the uplink channel/signal information of the UE for determining the synchronization delay is T2, the determined synchronization delay difference is ΔT=T2−T1, 12 quantization levels may be set, and specifically, when the synchronization delay difference is less than −500 μs, the quantization level is set to be −6; when the synchronization delay difference is greater than or equal to −500 μs and less than −400 μs, the quantization level is set to be −5; when the synchronization delay difference is greater than or equal to −00 μs and less than −300 μs, the quantization level is set to be −4; when the synchronization delay difference is greater than or equal to −300 μs and less than −200 μs, the quantization level is set to be −3; when the synchronization delay difference is greater than or equal to −200 μs and less than −00 μs, the quantization level is set to be −2; when the synchronization delay difference is greater than or equal to −100 μs and less than 0 μs, the quantization level is set to be −1; when the synchronization delay difference is greater than or equal to 0 μs and less than 100 μs, the quantization level is set to be 1; when the synchronization delay difference is greater than or equal to 100 μs and less than 200 μs, the quantization level is set to be 2; when the synchronization delay difference is greater than or equal to 200 μs and less than 300 μs, the quantization level is set to be 3; when the synchronization delay difference is greater than or equal to 300 μs and less than 400 μs, the quantization level is set to be 4; when the synchronization delay difference is greater than or equal to 400 μs and less than 500 μs, the quantization level is set to be 5; and when the synchronization delay difference is greater than or equal to 500 μs, the quantization level is set to be 6.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Embodiment 2

Figure 3:
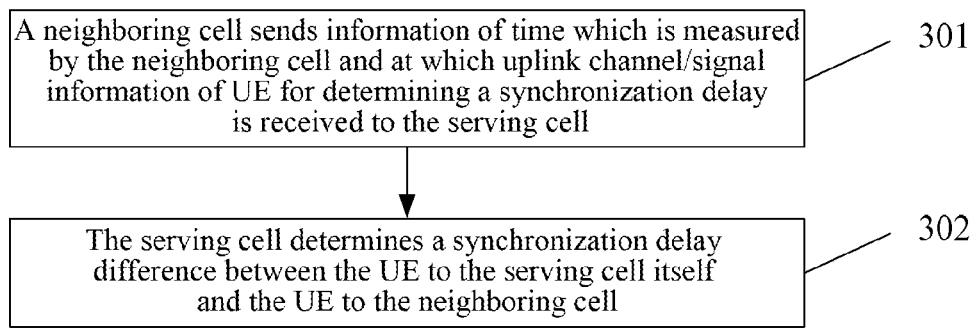
FIG. 3 is a flowchart of a method for determining a delay difference provided by embodiment 2 of the present document.

A method for determining a delay difference provided by this embodiment, as illustrated in FIG. 3, comprises the following steps:

in step 301, a neighboring cell of a serving cell sends information of time which is measured by the neighboring cell itself and at which uplink channel/signal information of UE for determining a synchronization delay is received to the serving cell.

Here, the serving cell refers to a cell in which the UE resides; and the neighboring cell refers to a neighboring cell of the serving cell.

The serving cell may be a macro cell or a small cell; correspondingly, when the serving cell is a macro cell, the neighboring cell is a small cell; and when the serving cell is a small cell, the neighboring cell is a macro cell or a small cell; wherein the macro cell corresponds to a macro base station; and the small cell corresponds to a small base station.

The uplink channel/signal for determining the synchronization delay may be any one of PUSCH, PUCCH, PRACH, DMRS and SRS; and in actual application, one of the channels/signals may be selected as needed.

Before this step is executed, the method may further comprise:

the serving cell informs the neighboring cell of configuration information of an uplink channel/signal of the UE for determining the synchronization delay, such that the neighboring cell can correctly receive the uplink channel/signal information sent by the UE for determining the synchronization delay at a correct time.

Before this step is executed, the method may further comprise:

the serving cell sends configuration information of an uplink channel/signal to the UE, such that the UE can send information to the serving cell according to the configuration information and thus the serving cell can correctly receive the information sent by the UE.

When the neighboring cell is a small cell and a state of the neighboring cell is an off state, before this step, the method may further comprise:

a cluster-head to which the serving cell and the neighboring cell belong or a macro cell informs the UE of patterns and measurement indications of a DTX_ON state and a DRX_ON state of the neighboring cell during a sleep period, such that the neighboring cell can receive the uplink channel/signal information sent by the UE for determining the synchronization delay; and correspondingly, the UE sends the uplink channel/signal information for determining the synchronization delay according to the patterns of the DTX_ON state and the DRX_ON state of the neighboring cell during the sleep period.

Herein, which sends the patterns and the measurement indications of the DTX_ON state and the DRX_ON state of the neighboring cell during the sleep period may be decided according to the nature of the serving cell; specifically, when the serving cell is not a macro cell or a cluster-head, the cluster-head to which the serving cell and the neighboring cell belong or the macro cell may inform the UE of the patterns and the measurement indications of the DTX_ON state and the DRX_ON state of the neighboring cell during the sleep period; and when the serving cell is a macro cell and is not a cluster-head, the cluster-head to which the serving cell or the neighboring cell belongs may inform the UE of the patterns and the measurement indications of the DTX_ON state and the DRX_ON state of the neighboring cell during the sleep period, and so on.

The cluster-head refers to a manager of a cluster formed by several small cells, a function of the cluster-head is to manage the small cells in the cluster, the cluster-head may be a small cell and may also be a macro cell or an independent management entity, and the specific function of the cluster-head is similar to the function of the macro cell; and it may be set as needed that it is the cluster-head to which the serving cell and the neighboring cell belong or the macro cell which informs the UE of the patterns of the DTX_ON state and the DRX_ON state of the neighboring cell during the sleep period.

As illustrated in FIG. 2, the off state refers to that, when the small cell has no service or no UE connection, the small base station corresponding to the small cell is turned off to reduce interference and power consumption, generally the small base station will turn off a downlink transmitter and a state of an uplink receiver of the small base station depends on a specific situation.

The DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time period during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

The DRX_ON state is a sub-state of the off state, as illustrated in FIG. 2, the DRX_ON state refers to that, when the small cell has no service or no UE connection, the small base station corresponding to the small cell turns off the downlink transmitter, and simultaneously the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information, wherein the discovery signal information is used for cell discovery; and the PSS/SSS and/or CRS information is used for synchronization. The sending periods of these signals may be inconsistent. When the small cell is in the DTX_ON state, the small cell may send one or more of these signals.

The patterns may comprise information such as period, offset and duration, etc.

In step 302, the serving cell determines a synchronization delay difference between the UE to the serving cell and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay.

The method may further comprise:

the serving cell sends the determined synchronization delay difference to the UE;

the UE receives information sent by the serving cell and the neighboring cell by using the synchronization delay difference; or the serving cell sends information to the UE in advance or delay according to the determined synchronization delay difference.

Herein, sending the determined synchronization delay difference to the UE specifically comprises:

the serving cell sends an absolute value or a quantization level of the synchronization delay difference to the UE; or the serving cell sends the quantization level of the synchronization delay difference and signaling to the UE; or the serving cell sends the absolute value of the synchronization delay difference and signaling to the UE.

Here, the quantization level may be set as needed. For example, supposing that the information of time which is measured by the serving cell and at which the uplink channel/signal information of the UE for determining the synchronization delay is T1 and the information of time which is measured by the neighboring cell and at which the uplink channel/signal information of the UE for determining the synchronization delay is T2, the determined synchronization delay difference is $\Delta T = T2 - T1$, 12 quantization levels may be set, and specifically, when the synchronization delay difference is less than $-500$ μs, the quantization level is set to be $-6$; when the synchronization delay difference is greater than or equal to $-500$ μs and less than $-400$ μs, the quantization level is set to be $-5$; when the synchronization delay difference is greater than or equal to $-400$ μs and less than $-300$ μs, the quantization level is set to be $-4$; when the synchronization delay difference is greater than or equal to $-300$ μs and less than $-200$ μs, the quantization level is set to be $-3$; when the synchronization delay difference is greater than or equal to $-200$ μs and less than $-100$ μs, the quantization level is set to be $-2$; when the synchronization delay difference is greater than or equal to $-100$ μs and less than $0$ μs, the quantization level is set to be $-1$; when the synchronization delay difference is greater than or equal to $0$ μs and less than $100$ μs, the quantization level is set to be 1; when the synchronization delay difference is greater than or equal to $100$ μs and less than $200$ μs, the quantization level is set to be 2; when the synchronization delay difference is greater than or equal to $200$ μs and less than $300$ μs, the quantization level is set to be 3; when the synchronization delay difference is greater than or equal to $300$ μs and less than $400$ μs, the quantization level is set to be 4; when the synchronization delay difference is greater than or equal to $400$ μs and less than $500$ μs, the quantization level is set to be 5; and when the synchronization delay difference is greater than or equal to $500$ μs, the quantization level is set to be 6.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Embodiment 3

Figure 4:
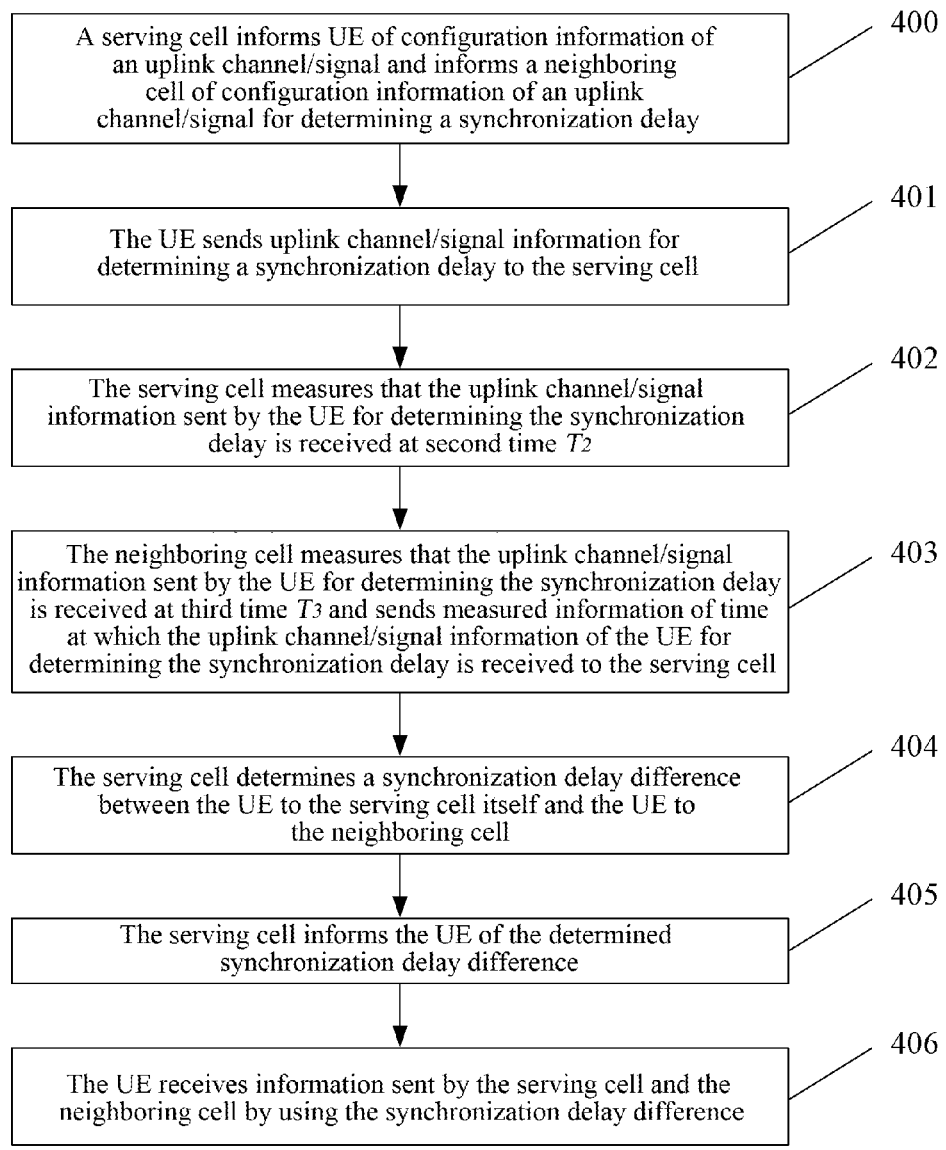
FIG. 4 is a flowchart of a method for determining a delay difference provided by embodiment 3 of the present document.

In this embodiment, it is supposed that a serving cell of UE is a small cell 1 or a macro cell and a neighboring cell of the serving cell is a small cell 2. A method for determining a delay difference provided by this embodiment, as illustrated in FIG. 4, comprises the following steps:

in step 400, a serving cell informs UE of configuration information of an uplink channel/signal and informs a neighboring cell of configuration information of an uplink channel/signal for determining a synchronization delay, and then step 401 is executed.

Here, the configuration information of the uplink channel/signal informed to the UE may comprise time frequency resources, sequence resources, power and the like occupied for sending the uplink channel/signal information; and correspondingly, the configuration information of the uplink channel/signal informed to the neighboring cell, i.e., the small cell 2, may comprise time frequency resources, sequence resources, power and the like occupied for sending the uplink channel/signal information.

The uplink channel/signal for determining the synchronization delay may be an SRS, etc.

Figure 5:
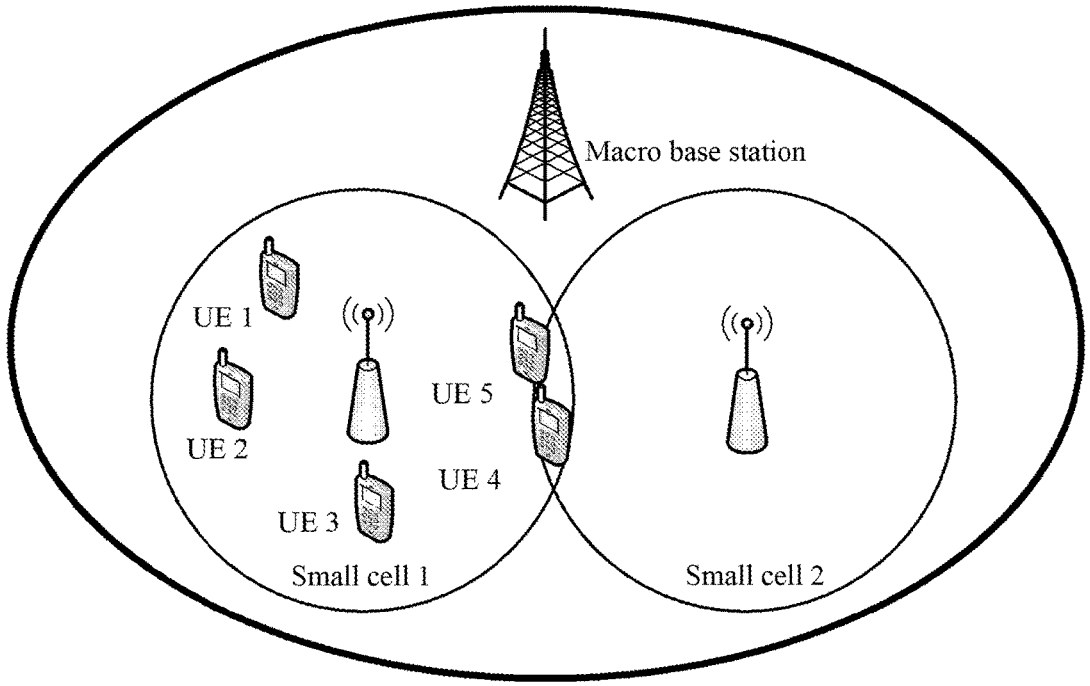
FIG. 5 is a structural schematic diagram of a small cell system in embodiment 3 of the present document.

In actual application, when the serving cell has a plurality of neighboring cells, the serving cell may only inform the neighboring cell in a specific set of the configuration information of the uplink channel/signal for determining the synchronization delay; wherein the neighboring cell in the specific cell set may be determined as needed. For example, as illustrated in FIG. 5, UEs in areas covered by the small cell 1 and the small cell 2 at the same time comprise UE4 and UE5, and supposing that the small cell 1 is the serving cell, the small cell 1 and the small cell 2 may form a small set related to the UE 4 and UE 5; and the small cell 1 only informs the small cell 2 of the configuration information of the uplink channel/signals of the UE 4 and UE 5 for determining the synchronization delay.

In actual application, when the serving cell informs the neighboring cell of the configuration information of the uplink channel/signal for determining the synchronization delay, under the situation that there are more than two UEs and the more than two UEs have the same serving cell, the serving cell may limit the configuration information of the uplink channel/signal of each UE for determining the synchronization delay to reduce the complexity of signaling interaction between cells. For example, the uplink channel/signals of the UEs, which belong to the same cell set, for determining the synchronization delay may be configured to use the same time frequency resources but have different rotary phases, and at this moment the serving cell only needs to inform the neighboring cell of the phase rotation information of the uplink channel/signal of each UE for determining the synchronization delay, and does not need to inform the neighboring cell of all configuration information of the uplink channel/signal of each UE for determining the synchronization delay. Further, for the UEs which are close to each other, the serving cell may also only inform the neighboring cell of the configuration information of the uplink channel/signal of one UE which is one of a plurality of UEs which are close to each other, for determining the synchronization delay, and the synchronization delay difference determined by the UE is used as the synchronization delay difference of another UE of the plurality of UEs which are close to each other. For example, as illustrated in FIG. 5, UEs in areas covered by a small cell 1 and a small cell 2 at the same time comprise UE 4 and UE 5, and the small cell 1 and the small cell 2 may form a small cell set related to the UE 4 and the UE 5; wherein both the UE 4 and the UE 5 belong to the small cell 1, i.e., the serving cell of the UE 4 and the UE 5 is the small cell 1, the UE 4 and the UE 5 also simultaneously are located at the cell edges of the small cell 1 and the small cell 2, geographical locations are close, delay differences are also close, thus the small cell may only inform the small cell 2 of the configuration information of the uplink channel/signal of the UE 4 for determining the synchronization delay, and the small cell 1 further uses the synchronization delay difference determined by the UE 4 as the synchronization delay difference of the UE 5.

Here, when the neighboring cell of the serving cell, i.e., the small cell 2, is in an off state, the serving cell, the cluster-head or the macro cell needs to inform the UE of patterns and measurement indications of a DTX_ON state and a DRX_ON state of the neighboring cell during a sleep period, such that the neighboring cell can receive information sent by the UE at a correct time.

Herein, as illustrated in FIG. 2, the off state refers to that, when the small cell has no service or no UE connection, the small base station corresponding to the small cell is turned off to reduce interference and power consumption, generally the small base station will turn off a downlink transmitter and a state of an uplink receiver of the small base station depends on a specific situation.

The DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time period during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

The DRX_ON state is a sub-state of the off state, as illustrated in FIG. 2, the DRX_ON state refers to that, when the small cell has no service or no UE connection, the small base station corresponding to the small cell turns off the downlink transmitter, and simultaneously the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information. Wherein the discovery signal information is used for cell discovery; and the PSS/SSS and/or CRS information is used for synchronization. The sending periods of these signals may be inconsistent. When the small cell is in the DTX_ON state, the small cell may send one or more of these signals.

The patterns may comprise information such as period, offset and duration, etc.

In step 401, the UE sends uplink channel/signal information for determining a synchronization delay to the serving cell at the first time $T_0$.

Here, that the UE sends the uplink channel/signal information for determining a synchronization delay to the serving cell at the first time $T_0$ refers to that the UE sends the uplink channel/signal information for determining the synchronization delay to a base station corresponding to the serving cell at the first time $T_0$; and specifically the UE sends the uplink channel/signal information for determining the synchronization delay to a small base station corresponding to the small cell 1 or a macro base station corresponding to a macro cell at the first time $T_0$.

In step 402, the serving cell measures that the uplink channel/signal information sent by the UE for determining the synchronization delay is received at the second time $T_2$.

In step 403, the neighboring cell measures that the uplink channel/signal information sent by the UE for determining the synchronization delay is received at the third time $T_3$ and sends the measured information of time at which the uplink channel/signal information of the UE for determining the synchronization delay is received to the serving cell.

Here, since the neighboring cell is neighboring to the serving cell, the neighboring cell may receive the uplink channel/signal information sent by the UE for determining the synchronization delay.

If the state of the neighboring cell is the on state, the neighboring cell may normally receive the uplink channel/signal information sent by the UE for determining the synchronization delay;

If the state of the neighboring cell is the off state, and specifically the downlink transmitter is only turned off but the uplink receive is always in the on state, the neighboring cell can normally receive the uplink channel/signal information sent by the UE for determining the synchronization delay; and if the state of the neighboring cell is the off state, and specifically the downlink transmitter and the uplink receiver are in the off state, it may be regulated that the neighboring cell turns on the uplink receiver of the neighboring cell according to a certain period, further it is appointed that the UE may send the uplink channel/signal information for determining the synchronization delay at the time when the uplink receiver in the DRX_ON state of the neighboring cell is turned on, the neighboring cell is still in the DRX_ON state at the third time T3, i.e., the neighboring cell is in the DRX_ON state in a period of time from the first time T1 at which the UE sends the uplink channel/signal information for determining the synchronization delay to the third time T3 at which the neighboring cell receives the uplink channel/signal information for determining the synchronization delay; and in other words, a duration that the neighboring cell is in the DRX_ON state needs to be constrained to guarantee that the neighboring cell in the DRX_ON state can receive the uplink channel/signal information sent by the UE for determining the synchronization delay after a transmission delay of the uplink channel/signal information for determining the synchronization delay.

Herein, if the uplink channel/signal information, which is received by the neighboring cell, for determining the synchronization delay is lower than a set threshold under the condition that the duration that the neighboring cell is in the DRX_ON state is guaranteed, it indicates that the UE is enough far away from the neighboring cell, the intensity of the uplink channel/signal information for determining the synchronization delay becomes very weak after path loss and attenuation, the neighboring cell cannot be used for transmitting the channel/signal information, at this moment the neighboring cell does not send the information of time which is measured by the neighboring cell and at which the uplink channel/signal information of the UE for determining the synchronization delay is received to the serving cell, and in other words, the UE does not need to send the information to the far neighboring cell.

Sending the measured information of time at which the uplink channel/signal information of the UE for determining the synchronization delay is received to the serving cell refers to sending the third time T3 to the serving cell, wherein the neighboring cell may send the third time T3 to the serving cell through backhaul signaling.

In actual application, the sequence for executing steps 402 and 403 is not limited.

In step 404, the serving cell determines a synchronization delay difference between the UE to the serving cell and the UE to the neighboring cell according to the information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received.

Specifically, the serving cell calculates the synchronization delay difference between the UE to the serving cell and the UE to the neighboring cell: $\Delta t_1 = T_3 - T_2$.

In step 405, the serving cell informs the UE of the determined synchronization delay difference.

Here, the way for the serving cell informing the UE of the determined synchronization delay difference may be an absolute value of the synchronization delay difference or a quantization level of the synchronization delay difference, and may also be the absolute value of the synchronization delay difference and information (1 signaling) or the quantization level of the synchronization delay difference and information (1 signaling).

When the determined synchronization delay difference is small and can be neglected, the serving cell may not inform the UE of the determined synchronization delay difference. Specifically, the serving cell may send no information (0 signaling) to the UE or the serving cell may not send any information to the UE.

In step 406, after the UE receives the informed synchronization delay difference, the UE receives information sent by the serving cell and the neighboring cell by using the synchronization delay difference.

Here, the UE may align received signals of two cells by using the synchronization delay difference, or enlarge a search window under the condition of the informed synchronization delay difference.

The specific implementation of this step is not a content which is concerned about by the present application, and the specific implementation of this step may adopt the existing art.

In actual application, the serving cell may also not inform the UE of the determined synchronization delay difference. Under this situation, the serving cell sends information to the UE in delay or advance according to the determined synchronization delay difference, such that the UE can synchronously receive the information sent by the serving cell and the neighboring cell, and in other words, steps 405-406 may not be executed but the serving cell compensates for the synchronization delay difference, such that the UE can synchronously receive the information sent by the serving cell and the neighboring cell.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Embodiment 4

Figure 6:
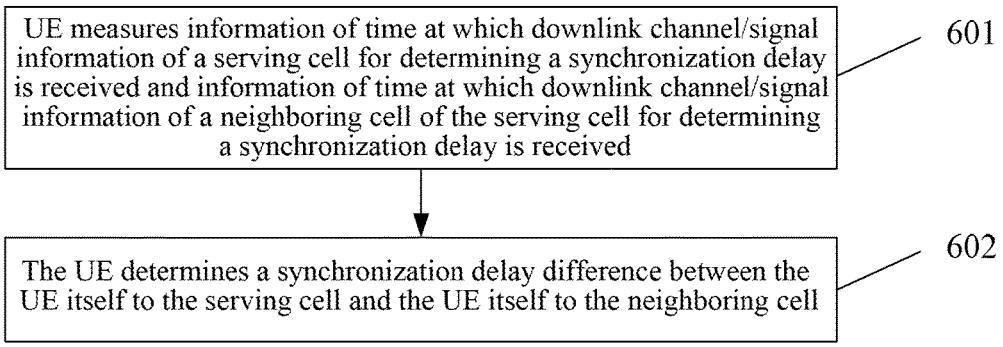
FIG. 6 is a flowchart of a method for determining a delay difference provided by embodiment 4 of the present document.

A method for determining a delay difference provided by this embodiment, as illustrated in FIG. 6, comprises the following steps:

in step 601, UE measures information of time at which downlink channel/signal information of a serving cell for determining a synchronization delay is received and information of time at which downlink channel/signal information of a neighboring cell of the serving cell for determining a synchronization delay is received.

Here, the serving cell refers to a cell in which the UE resides; and the neighboring cell refers to a neighboring cell of the serving cell.

The serving cell may be a macro cell or a small cell; correspondingly, when the serving cell is a macro cell, the neighboring cell is a small cell; and when the serving cell is a small cell, the neighboring cell is a macro cell or a small cell; wherein the macro cell corresponds to a macro base station; and the small cell corresponds to a small base station.

The downlink channel/signal for determining the synchronization delay may be any one of Physical Downlink Shared CHannel (PDSCH), Physical Downlink Control CHannel (PDCCH), Cell-specific Reference Signal (CRS), UE-specific Reference Signal (DM-RS), Positioning Reference Signal (PRS) and CSI Reference Signal (CSI-RS); and in actual application, one of the channels/signals may be selected from the above signals as needed.

The UE knows the downlink channel/signal information which is the downlink information/signal information for determining the synchronization delay in advance; and correspondingly, the serving cell and the neighboring cell also know the time at which the downlink information/signal information for determining the synchronization delay is sent in advance.

Before this step, the method may further comprise:

the UE receives configuration information of a downlink channel/signal sent by the serving cell, such that the UE can correctly receive information according to the configuration information.

When the neighboring cell is a small cell and a state of the neighboring cell is an off state, before this step, the method may further comprise:

the UE receives patterns and measurement indications, which are informed by a cluster-head to which the serving cell or the neighboring cell belong or a macro cell, of a DTX_ON state and a DRX_ON state of the neighboring cell during a sleep period, such that the UE can receive the downlink channel/signal information sent by the neighboring cell for determining the synchronization delay at a correct time.

Herein, which sends the patterns and the measurement indications of the DTX_ON state and the DRX_ON state of the neighboring cell during the sleep period may be decided according to the nature of the serving cell; specifically, when the serving cell is not a macro cell or a cluster-head, the cluster-head to which the serving cell and the neighboring cell belong or the macro cell may inform the UE of the patterns and the measurement indications of the DTX_ON state and the DRX_ON state of the neighboring cell during the sleep period; and when the serving cell is a macro cell and is not a cluster-head, the cluster-head to which the serving cell or the neighboring cell belongs may inform the UE of the patterns and the measurement indications of the DTX_ON state and the DRX_ON state of the neighboring cell during the sleep period, and so on.

The cluster-head refers to a manager of a cluster formed by several small cells, a function of the cluster-head is to manage the small cells in the cluster, the cluster-head may be a small cell and may also be a macro cell or an independent management entity, and the specific function of the cluster-head is similar to the function of the macro cell; and it may be set as needed that it is the cluster-head to which the serving cell and the neighboring cell belong or the macro cell which informs the UE of the patterns of the DTX_ON state and the DRX_ON state of the neighboring cell during the sleep period.

As illustrated in FIG. 2, the off state refers to that, when the small cell has no service or no UE connection, the small base station corresponding to the small cell is turned off to reduce interference and power consumption, generally the small base station will turn off a downlink transmitter and a state of an uplink receiver of the small base station depends on a specific situation.

The DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time period during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

the DRX_ON state is a sub-state of the off state, as illustrated in FIG. 2, the DRX_ON state refers to that, when the small cell has no service or no UE connection, the small base station corresponding to the small cell turns off the downlink transmitter, and simultaneously the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information. Wherein the discovery signal information is used for cell discovery; and the PSS/SSS and/or CRS information is used for synchronization. The sending periods of the signals may be inconsistent. When the small cell is in the DTX_ON state, the small cell may send one or more of the signals.

The patterns may comprise information such as period, offset and duration, etc.

In step 602, the UE determines a synchronization delay difference between the UE to the serving cell and the UE to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

Here, the method may further comprise:

the UE sends the determined synchronization delay difference to the serving cell, such that the serving cell sends information to the UE in advance or delay according to the determined synchronization delay difference.

Herein, sending the determined synchronization delay difference to the serving cell specifically comprises:

the UE sends an absolute value or a quantization level of the synchronization delay difference to the serving cell; or the UE sends the quantization level of the synchronization delay difference and signaling to the serving cell; or the UE sends the absolute value of the synchronization delay difference and signaling to the serving cell.

Here, the quantization level may be set as needed. For example, supposing that the information of time which is measured by the UE and at which the downlink channel/signal information of the serving cell for determining the synchronization delay is T3 and the information of time which is measured by the UE and at which the downlink channel/signal information of the neighboring cell for determining the synchronization delay is T4, the determined synchronization delay difference is ΔT=T4−T3, 12 quantization levels may be set, and specifically, when the synchronization delay difference is less than −500 μs, the quantization level is set to be −6; when the synchronization delay difference is greater than or equal to −500 μs and less than −400 μs, the quantization level is set to be −5; when the synchronization delay difference is greater than or equal to −400 μs and less than −300 μs, the quantization level is set to be −4; when the synchronization delay difference is greater than or equal to −300 μs and less than −200 μs, the quantization level is set to be −3; when the synchronization delay difference is greater than or equal to −200 μs and less than −100 μs, the quantization level is set to be −2; when the synchronization delay difference is greater than or equal to −100 μs and less than 0 μs, the quantization level is set to be −1; when the synchronization delay difference is greater than or equal to 0 μsp and less than 100 μs, the quantization level is set to be 1; when the synchronization delay difference is greater than or equal to 100 μs and less than 200 μs, the quantization level is set to be 2; when the synchronization delay difference is greater than or equal to 200 μs and less than 300 μs, the quantization level is set to be 3; when the synchronization delay difference is greater than or equal to 300 μs and less than 400 μs, the quantization level is set to be 4; when the synchronization delay difference is greater than or equal to 400 μs and less than 500 μs, the quantization level is set to be 5; and when the synchronization delay difference is greater than or equal to 500 μs, the quantization level is set to be 6.

The method may further comprise:

the UE receives information sent by the serving cell and the neighboring cell by using the synchronization delay difference.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Embodiment 5

Figure 7:
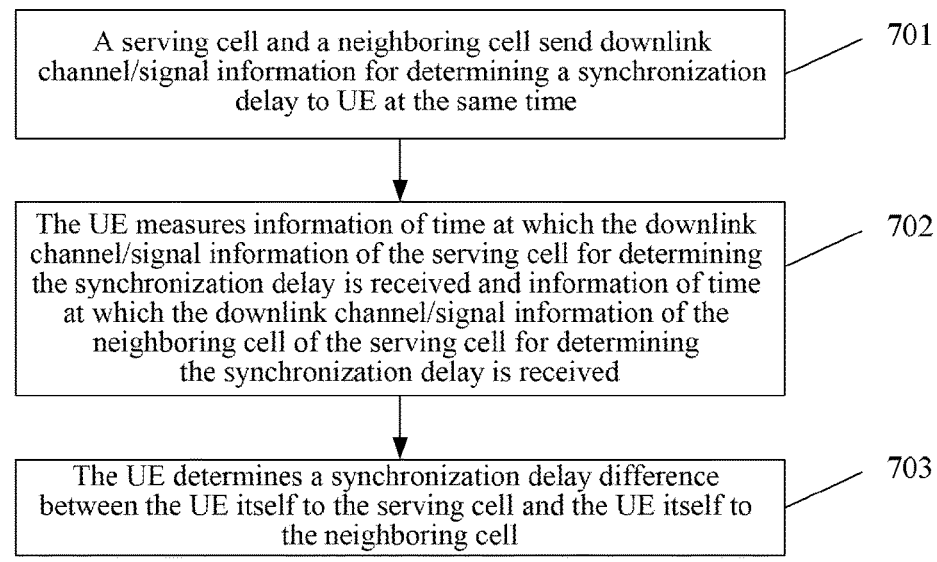
FIG. 7 is a flowchart of a method for determining a delay difference provided by embodiment 5 of the present document.

A method for determining a delay difference provided by this embodiment, as illustrated in FIG. 7, comprises the following steps:

in step 701, a serving cell and a neighboring cell send downlink channel/signal information for determining a synchronization delay to UE at the same time.

Here, the serving cell refers to a cell in which the UE resides; and the neighboring cell refers to a neighboring cell of the serving cell.

The serving cell may be a macro cell or a small cell; correspondingly, when the serving cell is a macro cell, the neighboring cell is a small cell; and when the serving cell is a small cell, the neighboring cell is a macro cell or a small cell, wherein the macro cell corresponds to a macro base station; and the small cell corresponds to a small base station.

The uplink channel/signal for determining the synchronization delay may be any one of PDSCH, PDCCH, CRS, DM-RS, PRS and CSI-RS; and in actual application, one of the channels/signals may be selected from the above channels/signals as needed.

Before this step, the method may further comprise:

the serving cell and the neighboring cell negotiate to determine sending time of the downlink channel/signal information for determining the synchronization delay; or a cluster-head to which the serving cell and the neighboring cell belong or a macro cell informs the serving cell and the neighboring cell of the sending time of the downlink channel/signal information for determining the synchronization delay; and correspondingly, the serving cell and the neighboring cell send the downlink channel/signal information for determining the synchronization delay according to the informed sending time.

Herein, which sends the patterns and the measurement indications of the DTX_ON state and the DRX_ON state of the neighboring cell during the sleep period may be decided according to the nature of the serving cell; specifically, when the serving cell is not a macro cell or a cluster-head, the cluster-head to which the serving cell and the neighboring cell belong or the macro cell may inform the UE of the patterns and the measurement indications of the DTX_ON state and the DRX_ON state of the neighboring cell during the sleep period; and when the serving cell is a macro cell and is not a cluster-head, the cluster-head to which the serving cell or the neighboring cell belongs may inform the UE of the patterns and the measurement indications of the DTX_ON state and the DRX_ON state of the neighboring cell during the sleep period, and so on.

The cluster-head refers to a manager of a cluster formed by several small cells, a function of the cluster-head is to manage the small cells in the cluster, the cluster-head may be a small cell and may also be a macro cell or an independent management entity, and the specific function of the cluster-head is similar to the function of the macro cell; and in actual application, the specific implementation mode that the serving cell and the neighboring cell are informed of the sending time of the downlink channel/signal information for determining the synchronization delay may be determined as needed.

Before this step, the method may further comprise:

the serving cell sends configuration information of a downlink channel/signal to the UE, such that the UE can correctly receive information according to the configuration information.

When the neighboring cell is a small cell and a state of the neighboring cell is an off state, before this step, the method may further comprise:

the cluster-head to which the serving cell and the neighboring cell belong or the macro cell informs the UE of patterns and measurement indications of a DTX_ON state and a DRX_ON state of the neighboring cell during a sleep period, such that the UE can correctly receive the downlink channel/signal information sent by the neighboring cell for determining the synchronization delay at a correct time; and correspondingly, the UE receives the downlink channel/signal information for determining the synchronization delay according to the patterns of the DTX_ON state and the DRX_ON state of the neighboring cell during the sleep period.

Herein, as illustrated in FIG. 2, the off state refers to that, when the small cell has no service or no UE connection, the small base station corresponding to the small cell is turned off to reduce interference and power consumption, generally the small base station will turn off a downlink transmitter and a state of an uplink receiver of the small base station depends on a specific situation.

The DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time period during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

The DRX_ON state is a sub-state of the off state, as illustrated in FIG. 2, the DRX_ON state refers to that, when the small cell has no service or no UE connection, the small base station corresponding to the small cell turns off the downlink transmitter, and simultaneously the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information. Wherein the discovery signal information is used for cell discovery; and the PSS/SSS and/or CRS information is used for synchronization. The sending periods of the signals may be inconsistent. When the small cell is in the DTX_ON state, the small cell may send one or more of the signals.

The patterns may comprise information such as period, offset and duration, etc.

In step 702, the UE measures information of time at which the downlink channel/signal information of the serving cell for determining the synchronization delay is received and information of time at which the downlink channel/signal information of the neighboring cell of the serving cell for determining the synchronization delay is received.

Here, the UE knows the downlink channel/signal information which is the downlink channel/signal information for determining the synchronization delay in advance.

In step 703, the UE determines a synchronization delay difference between the UE to the serving cell and the UE to the neighboring cell according to the measured information of time at which the downlink channel/signal information of the serving cell for determining the synchronization delay is received, and the measured information of time at which the downlink channel/signal information of the neighboring cell for determining the synchronization delay is received, wherein the downlink channel/signal information of the serving cell for determining the synchronization delay is the same as the downlink channel/signal information of the neighboring cell for determining the synchronization delay.

Here, the method may further comprise:

the UE sends the determined synchronization delay difference to the serving cell; and the serving cell sends information to the UE in advance or delay according to the determined synchronization delay difference.

Herein, sending the determined synchronization delay difference to the serving cell specifically comprises:

The UE sends an absolute value or a quantization level of the synchronization delay difference to the serving cell; or The UE sends the quantization level of the synchronization delay difference and signaling to the serving cell; or the UE sends the absolute value of the synchronization delay difference and signaling to the serving cell.

Here, the quantization level may be set as needed. For example, supposing that the information of time which is measured by the UE and at which the downlink channel/signal information of the serving cell for determining the synchronization delay is T3, and the information of time which is measured by the UE and at which the downlink channel/signal information of the neighboring cell for determining the synchronization delay is T4, the determined synchronization delay difference is ΔT=T4-T3, 12 quantization levels may be set, and specifically, when the synchronization delay difference is less than −500 μs, the quantization level is set to be −6; when the synchronization delay difference is greater than or equal to −500 μs and less than −400 μs, the quantization level is set to be −5; when the synchronization delay difference is greater than or equal to −400 μs and less than −300 μs, the quantization level is set to be −4; when the synchronization delay difference is greater than or equal to −300 μs and less than −200 μs, the quantization level is set to be −3; when the synchronization delay difference is greater than or equal to −200 μs and less than −100 μs, the quantization level is set to be −2; when the synchronization delay difference is greater than or equal to −100 μs and less than 0 μs, the quantization level is set to be −1; when the synchronization delay difference is greater than or equal to 0 µs and less than 100 µs, the quantization level is set to be 1; when the synchronization delay difference is greater than or equal to 100 µs and less than 200 µs, the quantization level is set to be 2; when the synchronization delay difference is greater than or equal to 200 µs and less than 300 µs, the quantization level is set to be 3; when the synchronization delay difference is greater than or equal to 300 µs and less than 400 µss, the quantization level is set to be 4; when the synchronization delay difference is greater than or equal to 400 µs and less than 500 µs, the quantization level is set to be 5; and when the synchronization delay difference is greater than or equal to 500 µs, the quantization level is set to be 6.

The method may further comprise:

the UE receives information sent by the serving cell and the neighboring cell by using the synchronization delay difference.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Embodiment 6

Figure 8:
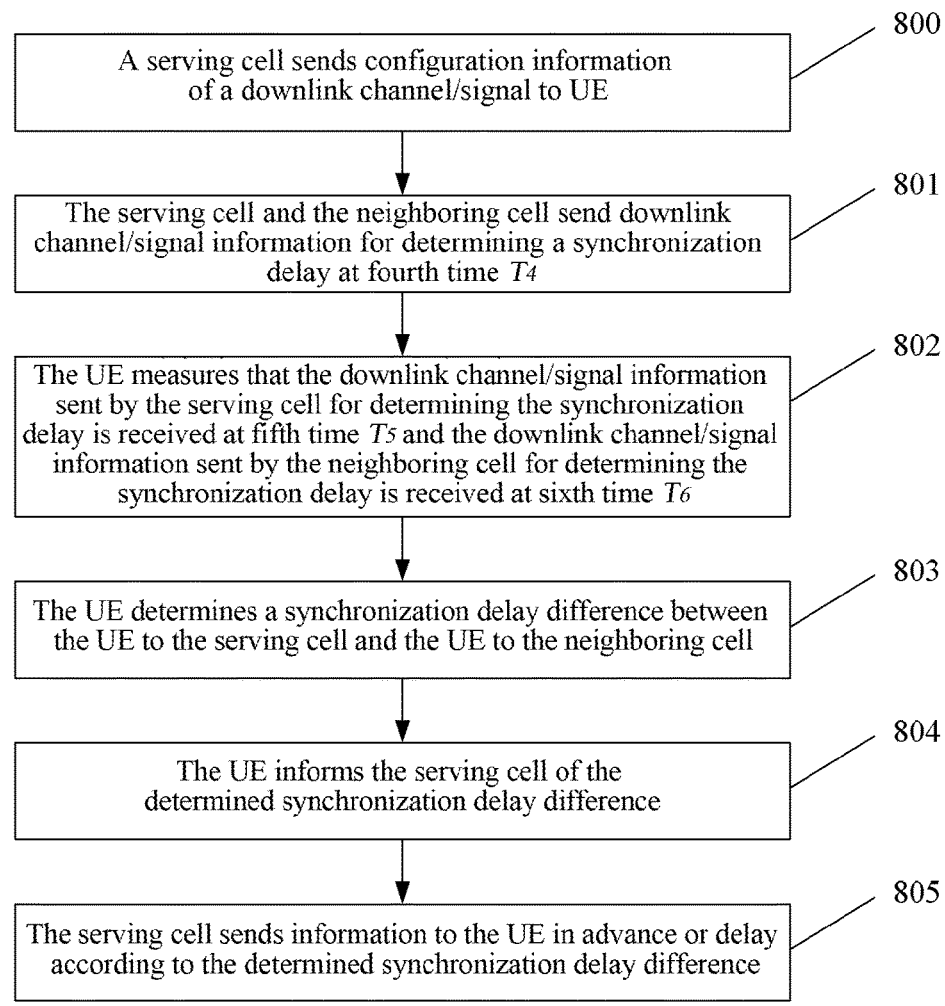
FIG. 8 is a flowchart of a method for determining a delay difference provided by embodiment 6 of the present document.

In this embodiment, it is supposed that a serving cell of UE is a small cell 1 or a macro cell, and a neighboring cell of the serving cell is a small cell 2. A method for determining a delay difference provided by this embodiment, as illustrated in FIG. 8, comprises the following steps:

in step 800, a serving cell sends configuration information of a downlink channel/signal to UE, such that the UE can correctly receive information according to the configuration information, and then step 801 is executed.

Here, the configuration information may comprise time frequency resources, sequence resources, power and the like occupied for sending the downlink channel/signal information.

When the neighboring cell of the serving cell, i.e., the small cell 2, is in an off state, the serving cell, the cluster-head or the macro cell needs to inform the UE of patterns and measurement indications of a DTX_ON state and a DRX_ON state of the neighboring cell during a sleep period, such that the UE can receive information sent by the neighboring cell at a correct time.

Herein, as illustrated in FIG. 2, the off state refers to that, when the small cell has no service or no UE connection, the small base station corresponding to the small cell is turned off to reduce interference and power consumption, generally the small base station will turn off a downlink transmitter and a state of an uplink receiver of the small base station depends on a specific situation.

the DTX_ON state is a sub-state of the off state, as illustrated in FIG. 2, the DTX_ON state refers to that, when the small cell has no service or no UE connection, the downlink transmitter of the small base station corresponding to the small cell is turned off and the downlink transmitter is periodically turned on to send discovery signal information and necessary downlink signal information; correspondingly, during other time period except the time period during which the downlink transmitter is periodically turned on, the downlink transmitter is turned off; and thus the state that the downlink transmitter is turned off during other time period expect the time period during which the downlink transmitter is periodically turned on may be called as a DTX_OFF state.

the DRX_ON state is a sub-state of the off state, as illustrated in FIG. 2, the DRX_ON state refers to that, when the small cell has no service or no UE connection, the small base station corresponding to the small cell turns off the downlink transmitter, and simultaneously the small base station periodically turns on the uplink receiver to receive necessary uplink signals; and correspondingly, the state that the uplink receiver is turned off during other time period expect the time period during which the uplink receiver is periodically turned on to not receive any signal may be called as a DRX_OFF state.

A state opposite to the off state is an on state, as illustrated in FIG. 2, the on state refers to that, when a triggering condition is satisfied (e.g., service conditions change, or the UE is associated with the cell or a data packet arrives), the small cell in the off state will be activated, and the small base station corresponding to the small cell turns on the downlink transmitter to make the downlink transmitter be always in the on state and then starts to send reference signal information, common channel information and data.

Here, in the DTX_ON state, the small cell may send discovery signal information and may also send a Primary Synchronization Signal/Secondary Synchronization Signal (PSS/SSS) and/or CRS information. Wherein the discovery signal information is used for cell discovery; and the PSS/SSS and/or CRS information is used for synchronization. The sending periods of the signals may be inconsistent. When the small cell is in the DTX_ON state, the small cell may send one or more of these signals.

The patterns may comprise information such as period, offset and duration, etc.

In step 801, the serving cell and the neighboring cell send downlink channel/signal information for determining a synchronization delay at the fourth time $T_4$.

Here, when this step is executed, the serving cell and the neighboring cell need to know sending time of the downlink channel/signal information for determining the synchronization delay, i.e., the fourth time $T_4$; and specifically, the serving cell and the neighboring cell negotiate to determine sending time of the downlink channel/signal information for determining the synchronization delay; or a cluster-head to which the serving cell and the neighboring cell belong or a macro cell informs the serving cell and the neighboring cell of the sending time of the downlink channel/signal information for determining the synchronization delay.

Correspondingly, the serving cell and the neighboring cell send the downlink channel/signal information for determining the synchronization delay according to the informed sending time.

In actual application, when the neighboring cell is a small cell, and only when the neighboring cell is in an on state or a DTX_ON state, can the downlink channel/signal information for determining the synchronization delay be sent.

In step 802, the UE measures that the downlink channel/signal information sent by the serving cell for determining the synchronization delay is received at the time $T_5$, and the downlink channel/signal information sent by the neighboring cell for determining the synchronization delay is received at the sixth time $T_6$.

In step 803, the UE determines a synchronization delay difference between the UE to the serving cell and the UE to the neighboring cell according to the measured information of time at which the downlink channel/signal information of the serving cell for determining the synchronization delay is received, and the measured information of time at which the downlink channel/signal information of the neighboring cell for determining the synchronization delay is received.

Specifically, the UE calculates the synchronization delay difference between the UE to the serving cell and the UE to the neighboring cell:

$$\Delta t_2 = T_6 - T_5.$$

In step 804, the UE informs the serving cell of the determined synchronization delay difference.

Here, the way for the UE informing the serving cell of the determined synchronization delay difference may be an absolute value of the synchronization delay difference or a quantization level of the synchronization delay difference, and may also be the absolute value of the synchronization delay difference and information (1 signaling), or the quantization level of the synchronization delay difference and information (1 signaling).

When the determined synchronization delay difference is small and can be neglected, the UE may not inform the serving cell of the determined synchronization delay difference. Specifically, the UE may send no information (0 signaling) to the serving cell, or the UE may not send any information to the serving cell.

In step 805, after the serving cell receives the informed synchronization delay difference, the serving cell sends information to the UE in advance or delay according to the determined synchronization delay difference.

Here, the specific implementation of this step is not a content which is concerned about by the present application, and the specific implementation of this step may adopt the existing art.

In actual application, the UE may also not inform the serving cell of the determined synchronization delay difference. Under this situation, after the UE receives the informed synchronization delay difference, the UE receives the information sent by the serving cell and the neighboring cell by using the synchronization delay difference, and in other words, steps 804-805 may not be executed but the UE compensates for the synchronization delay difference, such that the UE can synchronously receive the information send by the serving cell and the neighboring cell.

Herein, the UE may align received signals of two cells by using the synchronization delay difference, or enlarge a search window under the condition of the informed synchronization delay difference. Here, the specific implementation of this step is not a content which is concerned about by the present application, and the specific implementation of this step may adopt the existing art.

The method for determining the delay difference provided by the embodiment of the present document can effectively determine the synchronization delay difference between the UE to the serving cell and the UE to the neighboring cell and thus realize the synchronization of information from the serving cell and the small cell, which is received by the UE.

Figure 9:
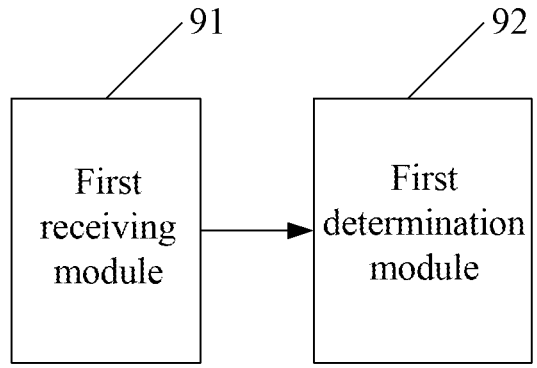
FIG. 9 is a structural schematic diagram of a base station provided by the embodiment of the present document.

Based on the method illustrated in FIG. 1, the embodiment of the present document provides a base station. As illustrated in FIG. 9, the base station comprises a first receiving module 91 and a first determination module 92, wherein, the first receiving module 91 is configured to receive information of time which is measured by a neighboring cell and at which uplink channel/signal information of UE for determining a synchronization delay is received; and the first determination module 92 is configured to determine a synchronization delay difference between the UE to the base station and the UE to the neighboring cell according to information of time which is measured by the base station itself and at which the uplink channel/signal information of the UE for determining the synchronization delay is received, and the information of time which is measured by the neighboring cell and at which the uplink channel/signal information of the UE for determining the synchronization delay is received, wherein the uplink channel/signal information, which is measured by the serving cell, of the UE for determining the synchronization delay is the same as the uplink channel/signal information, which is measured by the neighboring cell, of the UE for determining the synchronization delay.

Herein, the base station refers to a base station corresponding to a serving cell, i.e., a base station corresponding to a cell in which the UE resides; and the neighboring cell refers to a neighboring cell of the serving cell.

When the serving cell is a macro cell or a small cell, the base station is a macro base station or a small base station.

The base station may further comprise a first informing module configured to inform the neighboring cell of configuration information of an uplink channel/signal of the UE for determining the synchronization delay, such that the neighboring cell can receive the uplink channel/signal information sent by the UE for determining the synchronization delay at a correct time.

The base station may further comprise a second informing module configured to send the configuration information of the uplink channel/signal to the UE, such that the UE can send information to the serving cell according to the configuration information and thus the serving cell can correctly receive the information sent by the UE.

When the neighboring cell is a small cell and a state of the neighboring cell is an off state, the base station may further comprise a third informing module configured to inform the UE of patterns and measurement indications of a DTX_ON state and a DRX_ON state of the neighboring cell during a sleep period, such that the neighboring cell can receive the uplink channel/signal information sent by the UE for determining the synchronization delay at a correct time.

The base station may further comprise a first sending module configured to send the determined synchronization delay difference to the UE, such that the UE receives the information sent by the serving cell and the neighboring cell by using the synchronization delay difference; or configured to send information to the UE in advance or delay according to the determined synchronization delay difference.

Here, the specific processing process of the first sending module in the base station provided by the embodiment of the present document has already been described above in detail and thus is not repetitively described.

In actual application, the receiving module may be implemented by a receiver of the base station, the first determination module may be implemented by a Central Processing Unit (CPU), a Digital Signal Processor (DSP) or a Field Programmable Gate Array (FPGA) of the base station, and the first informing module, the second informing module, the third informing module and the first sending module may be implemented by a transmitter of the base station.

Figure 10:
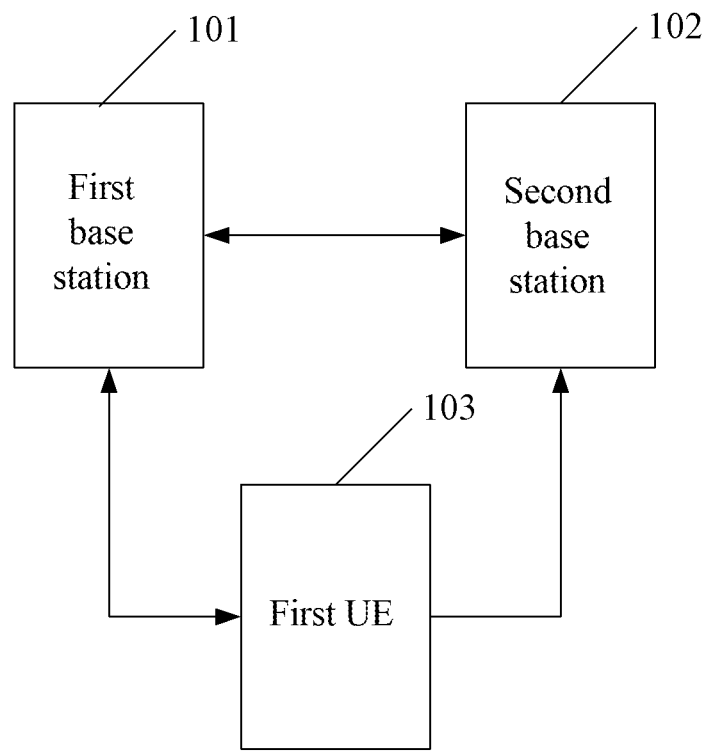
FIG. 10 is a structural schematic diagram of a system for determining a delay difference provided by the embodiment of the present document.

The embodiment of the present document further provides a system for determining a delay difference. As illustrated in FIG. 10, the system comprises a first base station 101 corresponding to a serving cell, a second base station 102 corresponding to a neighboring cell, and a first UE 103, wherein, the first base station 101 is configured to receive information of time which is measured by the second base station 102 and at which uplink channel/signal information of the first UE 103 for determining a synchronization delay is received; and determine a synchronization delay difference between the first UE 103 to the first base station 101 and the first UE to the second base station 102 according to information of time which is measured by the first base station 101 and at which the uplink channel/signal information of the first UE 103 for determining the synchronization delay is received, and the information of time which is measured by the second base station 102 and at which the uplink channel/signal information of the first UE 103 for determining the synchronization delay is received; and the second base station 102 is configured to send the information of time which is measured by the second base station 102 and at which the uplink channel/signal information of the first UE 103 for determining the synchronization delay is received to the first base station 101, wherein, the uplink channel/signal information, which is measured by the first base station 101, of the first UE 103 for determining the synchronization delay is the same as the uplink channel/signal information, which is measured by the second base station 102, of the first UE 103 for determining the synchronization delay.

Herein, the first base station 101 is a base station corresponding to a serving cell, and the first base station 101 may be a macro base station or a small base station; the second base station 102 is a base station corresponding to a neighboring cell; when the first base station 101 is a macro base station, the second base station 102 may be a small base station; and when the first base station 101 is a small base station, the second base station 102 can be a macro base station or a small base station.

The first base station 101 is further configured to inform the second base station 102 of configuration information of an uplink channel/signal of the first UE 103 for determining the synchronization delay, such that the second base station 102 can receive the uplink channel/signal information sent by the first UE 103 for determining the synchronization delay at a correct time; and the second base station 102 is configured to receive the configuration information of the uplink channel/signal, which is informed by the first base station 101, of the first UE 103 for determining the synchronization delay.

The first base station 101 is further configured to send the configuration information of the uplink channel/signal to the first UE 103, such that the UE 103 can send information to the serving cell according to the configuration information and thus the serving cell can correctly receive the information sent by the UE 103; and the first UE 103 is configured to receive the configuration information of the uplink channel/signal sent by the first base station 101.

When the second base station 102 is a small base station and a state of the second base station 102 is an off state, the first base station 101 is further configured to inform the first UE 103 of patterns and measurement indications of a DTX_ON state and a DRX_ON state of the second base station 102 during a sleep period, such that the second base station 102 can receive the uplink channel/signal information sent by the first UE 103 for determining the synchronization delay at a correct time; and the first UE 103 is further configured to receive the patterns and the measurement indications, which are informed by the first base station 101, of the DTX_ON state and the DRX_ON state of the second base station 102 during the sleep period; or when the second base station 102 is the small base station, the state of the second base station 102 is the off state and the first base station 101 is not a macro base station or a cluster-head, the system may further comprise a macro base station or a cluster-head, wherein, the macro base station or the cluster-head is configured to inform the first UE 103 of the patterns and the measurement indications of the DTX_ON state and the DRX_ON state of the second base station 102 during the sleep period, such that the second base station 102 can receive the uplink channel/signal information sent by the first UE 103 for determining the synchronization delay at a correct time; and the first UE 103 is further configured to receive the patterns and the measurement indications, which are informed by the macro base station or the cluster-head, of the DTX_ON state and the DRX_ON state of the second base station 102 during the sleep period.

The first base station 101 is further configured to send the determined synchronization delay difference to the first UE 103, such that the first UE 103 receives the information sent by the serving cell and the neighboring cell by using the synchronization delay difference; and the first UE 103 is further configured to receive the determined synchronization delay difference sent by the first base station 101, and then receive information sent by the first base station 101 and the second base station 102 by using the synchronization delay difference; or the first base station 101 is further configured to send information to the first UE 103 in advance or delay according to the determined synchronization delay difference; and the first UE 103 is further configured to receive the information sent by the first base station 101.

Here, the specific processing process of the first base station in the system for determining the delay difference provided by the embodiment of the present document has already been described above in detail and thus is not repetitively described.

Figure 11:
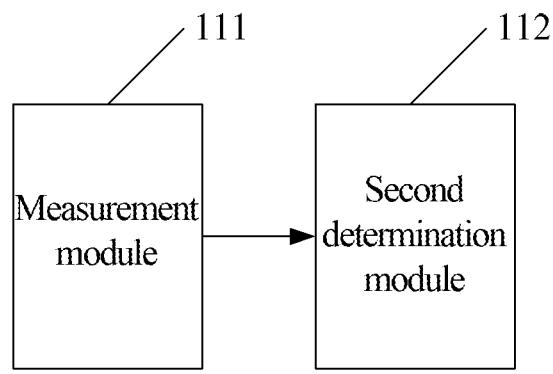
FIG. 11 is a structural schematic diagram of UE provided by the embodiment of the present document.

The embodiment of the present document further provides a UE. As illustrated in FIG. 11, the UE comprises a measurement module 111 and a second determination module 112, wherein, the measurement module 111 is configured to measure information of time at which downlink channel/signal information of a serving cell for determining a synchronization delay is received and information of time at which downlink channel/signal information of a neighboring cell of the serving cell for determining a synchronization delay is received; and the second determination module 112 is configured to determine a synchronization delay difference between the UE to the serving cell and the UE to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

Therein, the UE further comprises a second receiving module configured to receive configuration information of a downlink channel/signal sent by the serving cell, such that the UE can correctly receive information according to the configuration information.

When the neighboring cell is a small cell and a state of the neighboring cell is an off state, the second receiving module is further configured to receive patterns and measurement indications, which are informed by a cluster-head to which the serving cell or the neighboring cell belongs, of a DTX_ON state and a DRX_ON state of the neighboring cell during a sleep period, such that the UE can receive the downlink channel/signal information sent by the neighboring cell for determining the synchronization delay at a correct time.

The UE may further comprise a second sending module configured to send the determined synchronization delay difference to the serving cell, such that the serving cell sends information to the UE in advance or delay according to the determined synchronization delay difference; or the second receiving module is further configured to receive information sent by the serving cell and the neighboring cell by using the synchronization delay difference.

In actual application, the measurement module and the second determination module may be implemented by a Central Processing Unit (CPU), a Digital Signal Processor (DSP) or a Field Programmable Gate Array (FPGA) of the UE, the second receiving module may be implemented by a receiver of the UE, and the second sending module may be implemented by a transmitter of the UE.

Here, the specific processing process of the second sending module in the UE provided by the embodiment of the present document has already been described above in detail and thus is not repetitively described.

Figure 12:
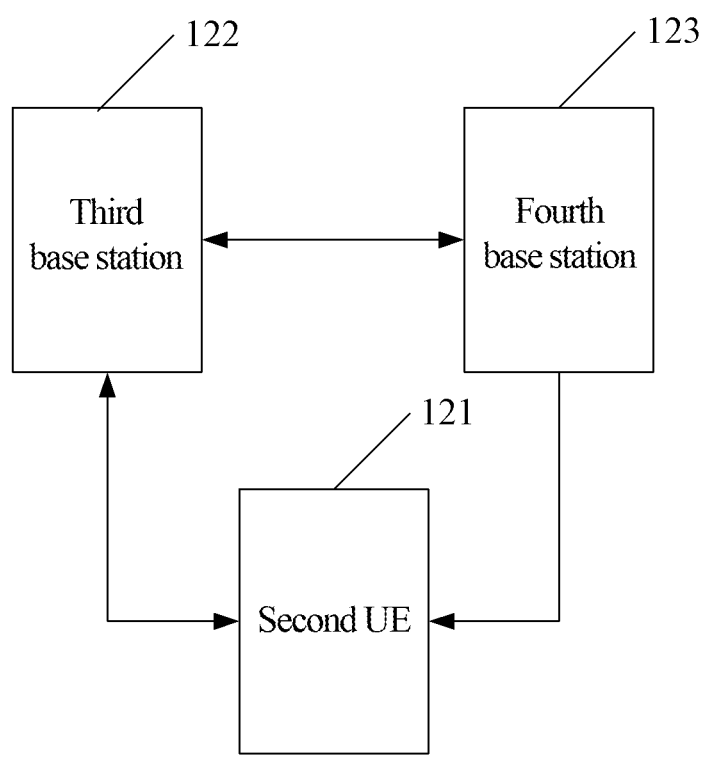
FIG. 12 is a structural schematic diagram of another system for determining a delay difference provided by the embodiment of the present document.

Based on the method illustrated in FIG. 7, the embodiment of the present document further provides a system for determining a delay difference. As illustrated in FIG. 12, the system comprises a second UE 121, a third base station 122 corresponding to a serving cell, and a fourth base station 123 corresponding to a neighboring cell, wherein, the second UE 121 is configured to measure information of time at which downlink channel/signal information of the third base station 122 for determining a synchronization delay is received and information of time at which downlink channel/signal information of the fourth base station 123 for determining a synchronization delay is received; and determine a synchronization delay difference between the second UE 121 to the third base station 122 and the second UE 121 to the fourth base station 123 according to the measured information of time at which the downlink channel/signal information of the third base station 122 for determining the synchronization delay is received, and the information of time at which the downlink channel/signal information of the fourth base station 123 for determining the synchronization delay is received, wherein the downlink channel/signal information of the third base station 122 for determining the synchronization delay is the same as the downlink channel/signal information of the fourth base station 123 for determining the synchronization delay;

the third base station 122 is configured to send the downlink channel/signal information for determining the synchronization delay to the second UE 121;

the fourth base station 123 is configured to send the downlink channel/signal information for determining the synchronization delay to the second UE 121; and the third base station 122 and the fourth base station 123 send the downlink channel/signal information for determining the synchronization delay to second UE 121 at the same time.

Herein, the third base station 122 is a base station corresponding to a serving cell, and the third base station 122 may be a macro base station or a small base station; the fourth base station 123 is a base station corresponding to a neighboring cell; when the third base station 122 is a macro base station, the fourth base station 123 may be a small base station; and when the third base station 122 is a small base station, the fourth base station 123 may be a macro base station or a small base station.

The third base station 122 is further configured to send configuration information of a downlink channel/signal to the second UE 121, such that the second UE 121 can correctly receive information according to the configuration information; and the second UE 121 is configured to receive the configuration information of the downlink channel/signal sent by the third base station 122.

When the fourth base station 123 is a small cell and a state of the fourth base station 123 is an off state, the third base station 122 is further configured to inform the second UE 121 of patterns and measurement indications of a DTX_ON state and a DRX_ON state of the fourth base station 123 during a sleep period, such that the second UE 121 can receive the downlink channel/signal information sent by the fourth base station 123 for determining the synchronization delay at a correct time; and the second UE 121 is further configured to receive the patterns and the measurement indications, which are informed by the third base station 122, of the DTX_ON state and the DRX_ON state of the fourth base station 123 during the sleep period; or when the fourth base station 123 is the small base station, the state of the fourth base station 123 is the off state and the third base station 122 is not a macro base station or a cluster-head, the system may further comprise a macro base station or a cluster-head, wherein, the macro base station or the cluster-head is configured to inform the second UE 121 of the patterns and the measurement indications of the DTX_ON state and the DRX_ON state of the fourth base station 123 during the sleep period, such that the second UE 121 can receive the downlink channel/signal information sent by the fourth base station 123 for determining the synchronization delay at a correct time; and the second UE 121 is further configured to receive the patterns and the measurement indications, which are informed by the macro base station or the cluster-head, of the DTX_ON state and the DRX_ON state of the fourth base station 123 during the sleep period.

The second UE 121 is further configured to send the determined synchronization delay difference to the third base station 122; and receive information sent by the third base station 122; and the third base station 122 is further configured to send information to the second UE 121 in advance or delay according to the determined synchronization delay difference after the synchronization delay difference sent by the second UE 121 is received; or the second UE 121 is further configured to receive information sent by the third base station 122 and the fourth base station 123 by using the synchronization delay difference.

Here, the specific processing process of the UE in the system for determining the delay difference provided by the embodiment of the present document has already been described above in detail and thus is not repetitively described.

One skilled in the art should understand that the embodiments of the present document may be provided as methods, systems or computer program products. Therefore, the present document may adopt the form of hardware embodiments, software embodiments or embodiments of hardware and software combinations. In addition, the present document may adopt the form of computer program products which are implemented on one or more computer-available storage mediums (including but not limited to magnetic disk memories, optical memories and the like) which include computer-available program codes.

The present document is described by referring to flowcharts and/or block diagrams of the method, the apparatus (system) and the computer program product according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes in the flowcharts and/or one block or more blocks in the block diagrams.

These computer program instructions may also be stored in computer-readable memories which can guide computers or other programmable data processing devices to work in a specific manner, such that the instructions stored in the computer-readable memories produce products comprising instruction devices, and the instruction devices realize functions designated in one process or more processes in the flowcharts and/or one block or more blocks in the block diagrams.

These computer program instructions may also be loaded to computers or other programmable data processing devices, such that a series of operation steps are executed on the computers or other programmable devices to perform processing realized by the computers, such that the instructions which are executed on the computers or other programmable devices provide steps for realizing functions designated in one process or more processes in the flowcharts and/or one block or more blocks in the block diagrams.

The embodiments described above are just preferred embodiments of the present document and are not used for limiting the protection scope of the present document.

What we claim is:

1. A method for determining a delay difference, comprising:
   a serving cell receiving information of time which is measured by a neighboring cell and at which uplink channel/signal information of User Equipment (UE) for determining a synchronization delay is received; and
   the serving cell determining a synchronization delay difference between the UE to the serving cell itself and the UE to the neighboring cell according to information of time which is measured by the serving cell itself and at which the uplink channel/signal information of the UE for determining the synchronization delay is received, and the information of time which is measured by the neighboring cell and at which the uplink channel/signal information of the UE for determining the synchronization delay is received; wherein the uplink channel/signal information, which is measured by the serving cell, of the UE for determining the synchronization delay is the same as the uplink channel/signal information, which is measured by the neighboring cell, of the UE for determining the synchronization delay.

2. The method according to claim 1, wherein, before said a serving cell receiving information of time which is measured by a neighboring cell and at which uplink channel/signal information of UE for determining a synchronization delay is received, the method further comprises:
   the serving cell informing the neighboring cell of configuration information of the uplink channel/signal of the UE for determining the synchronization delay.

3. The method according to claim 1, wherein, before said a serving cell receiving information of time which is measured by a neighboring cell and at which uplink channel/signal information of UE for determining a synchronization delay is received, the method further comprises:
   the serving cell sending the configuration information of the uplink channel/signal to the UE.

4. The method according to claim 1, wherein, when the neighboring cell is a small cell and a state of the neighboring cell is an off state, before said a serving cell receiving information of time which is measured by a neighboring cell and at which uplink channel/signal information of UE for determining a synchronization delay is received, the method further comprises:
   the serving cell informing the UE of patterns and measurement indications of a Discontinuous Transmission ON (DTX_ON) state and a Discontinuous Reception ON (DRX_ON) state of the neighboring cell during a sleep period.

5. The method according to claim 1, wherein the method further comprises:
   the serving cell sending the determined synchronization delay difference to the UE; or
   the serving cell sending information to the UE in advance or delay according to the determined synchronization delay difference.

6. The method according to claim 5, wherein said sending the determined synchronization delay difference to the UE comprises:
   the serving cell sending an absolute value or a quantization level of the synchronization delay difference to the UE; or
   the serving cell sending the quantization level of the synchronization delay difference and signaling to the UE; or
   the serving cell sending the absolute value of the synchronization delay difference and signaling to the UE.

7. A computer storage medium, comprising a group of instructions, which, when executed, enable at least one processor to implement the method for determining a delay difference according to claim 1.

8. A method for determining a delay difference, comprising:
   UE measuring information of time at which downlink channel/signal information of a serving cell for determining a synchronization delay is received and information of time at which downlink channel/signal information of a neighboring cell of the serving cell for determining a synchronization delay is received; and
   the UE determining a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received; wherein the downlink channel/signal information of the serving cell for determining the synchronization delay is the same as the downlink channel/signal information of the neighboring cell for determining the synchronization delay.

9. The method according to claim 8, wherein, before said measuring information of time at which downlink channel/signal information of a serving cell for determining a synchronization delay is received and information of time at which downlink channel/signal information of a neighboring cell of a serving cell for determining a synchronization delay is received, the method further comprises:
the UE receiving configuration information of the downlink channel/signal sent by the serving cell.

10. The method according to claim 8, wherein, when the neighboring cell is a small cell and a state of the neighboring cell is an off state, before said measuring information of time at which downlink channel/signal information of a serving cell for determining a synchronization delay is received and information of time at which downlink channel/signal information of a neighboring cell of a serving cell for determining a synchronization delay is received, the method further comprises:
the UE receiving patterns and measurement indications, which are informed by a cluster-head to which the serving cell and the neighboring cell belong or the serving cell, of a DTX_ON state and a DRX_ON state of the neighboring cell during a sleep period.

11. The method according to claim 8, wherein the method further comprises:
the UE sending the determined synchronization delay difference to the serving cell.

12. The method according to claim 11, wherein the UE sending the determined synchronization delay difference to the serving cell comprises:
the UE sending an absolute value or a quantization level of the synchronization delay difference to the serving cell; or
the UE sending the quantization level of the synchronization delay difference and signaling to the serving cell; or
the UE sending the absolute value of the synchronization delay difference and signaling to the serving cell.

13. The method according to claim 8, wherein the method further comprises:
the UE receiving information sent by the serving cell and the neighboring cell by using the synchronization delay difference.

14. The method according to claim 8, wherein
a serving cell and a neighboring cell sending downlink channel/signal information for determining a synchronization delay to UE at a same time;
before said a serving cell and a neighboring cell sending downlink channel/signal information for determining a synchronization delay to UE at a same time, the method further comprises:
the serving cell and the neighboring cell negotiating to determine sending time of the downlink channel/signal information for determining the synchronization delay; or a cluster-head to which the serving cell and the neighboring cell belong or a macro cell informing the serving cell and the neighboring cell of the sending time of the downlink channel/signal information for determining the synchronization delay; and
correspondingly, the serving cell and the neighboring cell sending the downlink channel/signal information for determining the synchronization delay according to the informed sending time.

15. A computer storage medium, comprising a group of instructions, which, when executed, enable at least one processor to implement the method for determining a delay difference according to claim 8.

16. A base station, comprising a first receiving module and a first determination module, wherein,
the first receiving module is configured to receive information of time which is measured by a neighboring cell and at which uplink channel/signal information of UE for determining a synchronization delay is received; and
the first determination module is configured to determine a synchronization delay difference between the UE to the base station itself and the UE to the neighboring cell according to information of time which is measured by the base station itself and at which the uplink channel/signal information of the UE for determining the synchronization delay is received, and the information of time which is measured by the neighboring cell and at which the uplink channel/signal information of the UE for determining the synchronization delay is received;
wherein the uplink channel/signal information, which is measured by the serving cell, of the UE for determining the synchronization delay is the same as the uplink channel/signal information, which is measured by the neighboring cell, of the UE for determining the synchronization delay.

17. The base station according to claim 16, wherein the base station further comprises a first informing module configured to inform the neighboring cell of configuration information of an uplink channel/signal of the UE for determining the synchronization delay.

18. The base station according to claim 16, wherein the base station further comprises a second informing module configured to send the configuration information of the uplink channel/signal to the UE.

19. The base station according to claim 16, wherein the base station further comprises a third informing module configured to, when the neighboring cell is a small cell and a state of the neighboring cell is an off state, inform the UE of patterns and measurement indications of a DTX_ON state and a DRX_ON state of the neighboring cell during a sleep period.

20. The base station according to claim 16, wherein the base station further comprises a first sending module configured to send the determined synchronization delay difference to the UE; or configured to send information to the UE in advance or delay according to the determined synchronization delay difference.

21. A user equipment (UE), comprising a measurement module and a second determination module, wherein,
the measurement module is configured to measure information of time at which downlink channel/signal information of a serving cell for determining a synchronization delay is received and information of time at which downlink channel/signal information of a neighboring cell of the serving cell for determining a synchronization delay is received; and
the second determination module is configured to determine a synchronization delay difference between the UE itself to the serving cell and the UE itself to the neighboring cell according to the measured information of time at which the downlink channel/signal information of the serving cell for determining the synchronization delay is received, and the measured information of time at which the downlink channel/signal information of the neighboring cell for determining the synchronization delay is received, wherein the downlink channel/signal information of the serving cell for determining the synchronization delay is the same as the downlink channel/signal information of the neighboring cell for determining the synchronization delay.

* * * * *